May 2, 1939.  C. L. HOPKINS  2,156,589
AUTOMATIC CLUTCH SYSTEM FOR MOTOR VEHICLES
Original Filed Nov. 17, 1932   3 Sheets-Sheet 1

INVENTOR.
Charles L. Hopkins
BY Jones, Addington, Ames & Seibold
ATTORNEYS.

INVENTOR.
Charles L. Hopkins.
BY Jones, Addington, Ames &
Seibold
ATTORNEYS.

Patented May 2, 1939

2,156,589

UNITED STATES PATENT OFFICE 2,156,589

AUTOMATIC CLUTCH SYSTEM FOR MOTOR VEHICLES

Charles L. Hopkins, River Forest, Ill., assignor to Bendix Products Corporation, South Bend, Ind., a corporation of Indiana Application November 17, 1932, Serial No. 643,031
Renewed February 7, 1936

28 Claims. (Cl. 192—3.5)

This invention relates to improvements in engine energized automatic means for engaging and disengaging the clutch on a motor vehicle.

One of the objects of the invention is to provide a device of this type which is positive and reliable in its action.

Another object is to provide such a device in which the clutch opens automatically only when connection between the engine and the drive wheels is not needed, as, for instance, when the gear shift is in neutral, instead of opening and closing every time the accelerator is released for coasting (free wheeling) and again depressed to speed up the engine.

Another object is to provide an engine energized clutch operating device which permits manual operation of the clutch when desired and does not prevent the clutch, when so operated, from being opened or closed as slowly or as rapidly as desired by the driver.

Other objects and advantages will be brought out in the following specification.

In the accompanying drawings, in which I have shown an embodiment of my invention—

In the several figures of the drawings, in which like reference numerals indicate the same or corresponding parts, 10 is the selective speed transmission and 11 is the gear shift lever. The accelerator pedal 12 is pivoted at 13 and is connected by means of a push rod 14 to an arm 15 fast on a rockshaft 16 to which is secured another arm 17. The throttle operating rod 18 is connected at one end to arm 17 and extends forward to the throttle (not shown). A spring 18a moves the throttle rod back when the accelerator is released.

In front of the gear box 10 is the usual self-closing clutch, extending from the casing 19 of which is the clutch rockshaft 20. The details of this clutch are not shown as such clutches are well known and have been in almost universal use on automobiles for many years. A clutch of this type includes in its assembly a number of springs whose function is to press the frictionally engaging parts together, and the power of these springs must be overcome when the clutch pedal is depressed to open or "disengage" the clutch. Secured on the rockshaft 20 is a member having two arms 21 and 22. Turning loosely on the rockshaft is the hub 23 of the clutch pedal 24. The clutch pedal is provided with an arm or lug 25 which, when the pedal is depressed, engages arm 22 and causes the rockshaft to turn and the clutch to disengage. A spring 26 returns the clutch pedal to normal position after it has been depressed and released. The clutch pedal may be used if desired, but ordinarily the automatic clutch operating means will be employed. I will first describe the form shown in Figure 1.

Figures 1, 2, 3, 4:
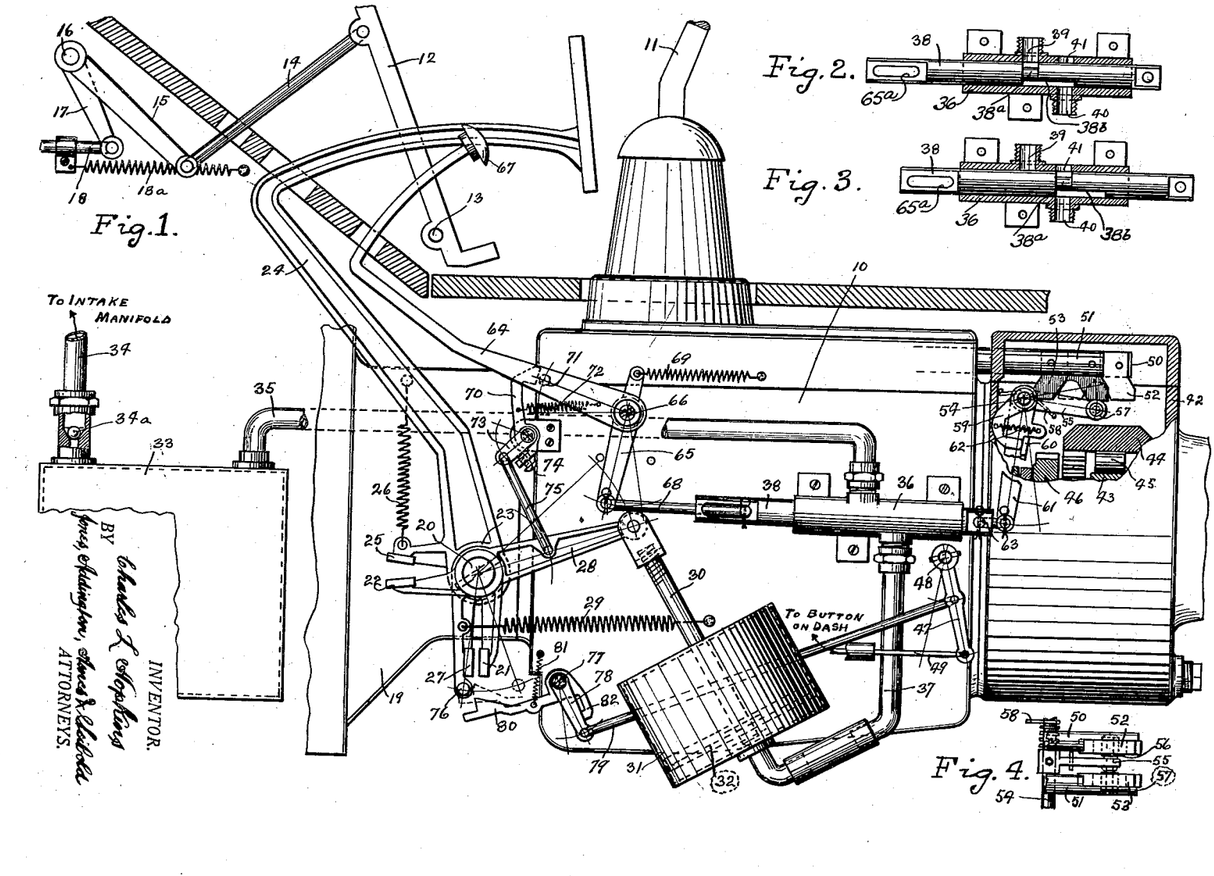
Figure 1 is a general view showing in side elevation the variable speed transmission unit or gear box and some other parts of an automobile, with the elements of the improved clutch system.
Fig. 2 is a longitudinal sectional view of a control valve which is employed to establish and cut off communication between the operating cylinder and the vacuum tank, showing the valve plunger in its normal position or as seen in Fig. 1 where the clutch is permitted to engage.
Fig. 3 shows the valve with the plunger in the position in which the cylinder is vented to the atmosphere, causing the clutch to be opened by the automatic means.
Fig. 4 is a detail on a reduced scale, showing part of the means whereby the position of the valve is changed when the gear shift lever is moved.

Another member, consisting of a lever having arms 27 and 28, is mounted to turn loosely on the rockshaft. A spring 29, secured to arm 27, tends to turn the lever on the rockshaft in the direction which would cause arm 27 to engage arm 21 and open the clutch. Connected to arm 28 is a piston rod 30 which extends to a cylinder 31 and carries at its inner end a piston 32. As seen in Fig. 1 the piston is at the rear end of its stroke and arm 27 is held out of contact with arm 21. The piston thus prevents the clutch from being disengaged by spring 29. The space in the cylinder in front of the piston is open to the atmosphere.

It will be seen that normally arm 21, which is fast on the rockshaft of the clutch, is free from contact with arm 27 so as to permit the clutch springs to hold the clutch closed. Spring 29, when permitted to do so, moves arm 27 into contact with arm 21, and then further movement of arm 27 opens the clutch in spite of its tendency to stay closed due to the pressure of its own springs. The function of the cylinder and piston is to hold arm 27 off arm 21 so that the clutch may stay closed until such time as it should open. Spring 29, of course, must have sufficient strength to overcome the pressure of the clutch springs. When the clutch pedal 24 is depressed, arm 25 engages arm 22 which, like arm 21, is fast on the rockshaft, and the clutch is forced open. Either the pedal or spring 29 may force the clutch open but normally both are free from connection with the clutch.

A small tank 33 is connected to the engine intake manifold (not shown) by means of a conduit 34, in which is a check valve 34a. While the engine is running the pressure within the tank is maintained sufficiently below atmospheric pressure to afford the required amount of suction effect for holding the piston at the rear end of the cylinder and thus permitting the clutch to remain engaged.

A conduit 35 extends from the vacuum tank 33 to a control valve 36 of the plunger type, another conduit 37 leading from the valve to the rear part of the cylinder 31. The control valve is formed with three ports 39, 40 and 41. Port 39 is connected through conduit 35 to the vacuum supply. Port 40 is connected through conduit 37 to the space in the cylinder 31 below the piston 32. Port 41 is a vent port. The plunger 38 has a portion 38a of reduced diameter arranged to register with either port 39 or port 41, and is cut away on its under side at 38b so that port 40 is placed in communication with vent port 41 in one position of the plunger and in communication with port 39 in the other position. The valve is shown in section in Fig. 1 with the plunger in the normal position. In this position communication is established and maintained between the vacuum tank and the cylinder so that the piston 32 will be held in and spring 29 prevented from disengaging the clutch.

In Fig. 3 the valve plunger has been moved to the right. It will be seen that in this position the plunger cuts off communication between port 39, which leads to the vacuum tank, and port 40, which leads to the cylinder, and also that port 40 is in communication with vent port 41. This vent port leads to the atmosphere, so that when the valve is moved to the right, as in Fig. 3, air may flow into the cylinder 31 and permit the piston 32 to be drawn out quickly by spring 29. When this occurs arm 27 engages arm 21 and the clutch is suddenly disengaged by the spring.

Behind the variable speed transmission 10 is a free-wheeling unit having a housing or casing 42. This free-wheeling unit, as shown here, is of the cam and roller type, a form of overrunning clutch. The automatic clutch of the present invention may be used with almost any form of clutch behind the transmission, and I have shown certain parts of a cam and roller clutch, although the construction and operation of such clutches are well known.

In the overrunning clutch shown, 43 and 44 are the two parts having the cam surfaces between which the rollers 45 are cramped when the engine is pulling the car. Part 43 is splined on and turns with the shaft 43a of the transmission and part 44 is splined on and turns with the propeller shaft 44a.

Figure 6:
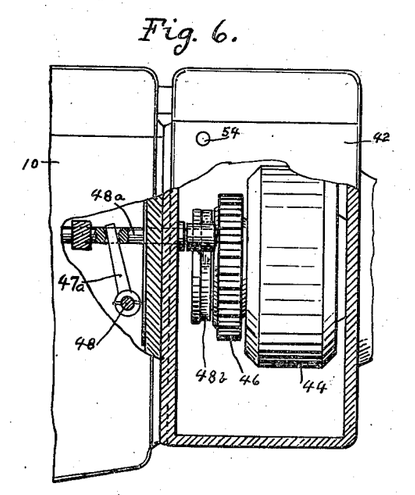
Fig. 6 is an elevational view of the free wheeling unit and a portion of the variable speed transmission, the housing being broken away to expose certain parts.
Figure 7:
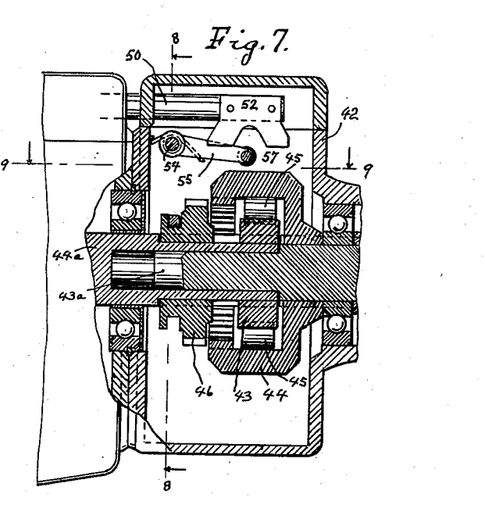
Fig. 7 is a vertical section of the free wheeling unit, the section being taken through the center of the drive shafts.
Figure 8:
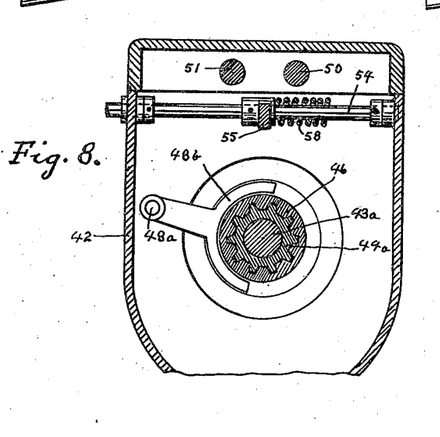
Fig. 8 is a vertical section on line 8—8 of Fig. 7, looking in the direction of the arrows.
Figure 9:
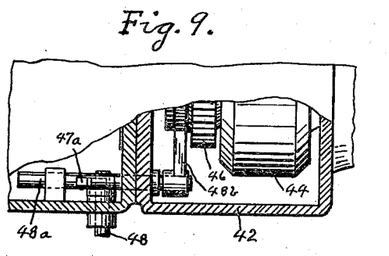
Fig. 9 is a top plan view corresponding to Figs. 6 and 7, partly sectional, on line 9—9 of Fig. 7.
Figure 10:
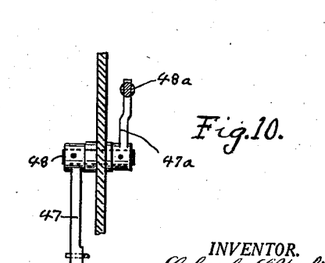
Fig. 10 is a detail of parts of the free-wheel cutout mechanism.
Figure 11:
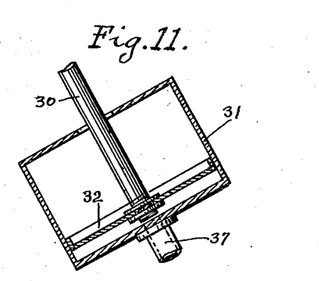
Fig. 11 is a sectional view of the vacuum cylinder and piston seen in Fig. 1.

In the free-wheeling units commonly in use on automobiles at the present time, means are provided whereby a positive connection between the variable transmission shaft and the propeller shaft may be had when desired. In a commonly used form of construction a member 46 is splined on the shaft 44a of the transmission so as to turn with the shaft although movable lengthwise of it, and acts as one member of a positive clutch, the other member being formed on part 44. These two members are provided with teeth which engage each other when member 46 is moved toward member 44. This positive clutch may be disengaged and engaged from the driver's position in order to "lock out" the free-wheeling. In some cases an arm, such as arm 47 in Fig. 1 and Fig. 10, is secured on a rockshaft, the turning of which shifts the movable member of the positive clutch. As seen in Figs. 6, 9 and 10, rockshaft 48 carries on its inner end arm 47a. The upper end of this arm engages in a slot formed in a slide rod 48a so that when arm 47 is swung rod 48a is moved longitudinally. This rod extends into the housing of the free wheel device and carries on this end the yoke 48b which shifts member 46 on shaft 44a into and out of engagement with member 44 and thus couples shaft 44a to shaft 43a or disconnects these shafts from each other. The arm 47 is moved by a push-pull wire 49 which leads to a button on the instrument board of the car (not shown).

In automatic clutches in which the partial vacuum in the intake manifold of the engine is employed to operate a piston in a cylinder, it is common practice to connect the control valve or valves to the accelerator, so that whenever the acelerator is released the clutch is disengaged. It is also common practice to have the suction from the engine manifold draw the piston back in the cylinder and thus disengage the clutch when communication is established through the valve. It will be observed that in the present system other means are provided for disengagement of the clutch and the suction effect is employed to prevent the clutch being opened by such means. There is always a condition of lowered pressure in the manifold while the engine is running, which assures the clutch being engaged whenever power from the engine is needed for the operation of the car. This will be explained more fully hereinafter.

I also depart from common practice in providing means other than the accelerator for opening and closing the control valve. In this system the clutch is opened quickly when the gear shift is put in neutral and is engaged quickly when the gear shift is put in any of the gear engaging positions. For starting the car, in which case the clutch should engage more slowly to permit a certain amount of slipping between the parts, there is provided a control button which the driver depresses to disengage the clutch or after it has been opened by the gear shift, and releases after he has put the gear shift in low or reverse. The means whereby the control valve is operated from the gear shift will be described first.

By referring to Figs. 1, 4, 7 and 8 it will be seen that the slide rods of the gear shift mechanism are lengthened so that they may extend rearwardly into the housing of the overrunning clutch. These rods 50 and 51 are provided with plate cams 52 and 53. A rockshaft 54 has secured to it an arm 55, carrying at its free end a pair of rollers 56 and 57. These rollers act as cam followers for engagement with the plate cams on the slide rods. In Fig. 4 both rods are in the intermediate position; in other words, the gear shift is in neutral. In Fig. 1 rod 51 is in the forward position and the other rod is in the intermediate position; that is, the gear shift is in high gear. The plate cams are formed with such a contour that if either of the rods is moved forwardly or backwardly from the intermediate position, one of the rollers will be depressed. If both rods are in the intermediate position, as is the case when in neutral, the rollers are free to rise. A spring 58, coiled about the shaft 54 tends to turn the same and swing the arm 55 and the rollers upwardly when the plate cams permit.

The rockshaft 54 extends outside the housing and has secured to its outer end an arm 59. The lower end of this arm engages a lug 60 on an arm 61 which turns loosely on the rockshaft. This arm 61 is pulled to the left, so as to normally maintain lug 60 in contact with the lower end of arm 59, by a spring 62. When arm 55, carrying the rollers 56 and 57, is swung up or down by the engagement of one of the plate cams 52 and 53 with one of these rollers, arm 61 usually swings also. Arm 61 may, however, be moved to the right even though the rollers are depressed, spring 62 stretching out to permit this.

The valve plunger 38 extends out from the body of the valve 36 at both sides. Its right hand end is connected to the lower end of arm 61 by a short link 63. When the gear shift is put in neutral and arm 55 permitted to swing upwardly, the valve plunger is moved to the right, as seen in Fig. 3. In this position of the plunger the vacuum cylinder is vented to the atmosphere and piston 32 is permitted to run out. Spring 29 pulls the piston out and through the engagement of arm 27 with arm 21 turns the rockshaft 20 of the clutch and disengages the latter.

With the accelerator released and the gear shift in gear the car coasts or "free-wheels". As shown in Fig. 1, the gear shift is in "high". Now, suppose the driver wishes to change to "second". The gear shift lever will first be moved to neutral. This may be done easily because of the fact that the transmission is free from the propeller shaft of the car, due to the presence of the overrunning clutch. The main clutch is opened quickly when the gear shift is put in neutral. As the transmission is now free at both ends, the gear shift may be put in second gear without any danger of clashing and without the exercise of any skill on the part of the driver. Of course, it is essential that the clutch disengage quickly when the gear shift is put in neutral, and for this reason the vent port 41 should be large. Spring 29 disengages the clutch very quickly when permitted to do so. It is not so essential that the clutch engage quickly after the shift has been made.

As is well known, the highest vacuum exists in the intake manifold of the engine when the latter is running at idling speed. This variation of the suction effect with the speed of the engine would make it necessary to use a large cylinder and piston if the vacuum storage tank 33 and check valve 34a were not interposed between the manifold and the control valve. The tank, like spring 29, acts as an energy storage device. Each time the engine is slowed down, as in free-wheeling or when shifting gears, the suction increases, and if for any reason the vacuum in the tank has fallen, the check valve opens and air is drawn out of the tank until the pressure in the tank is lowered to equal that in the manifold.

When shifting gears, as explained above, the accelerator is released and the gear shift lever moved to neutral. This causes the control valve to move to the right, shutting off communication between the tank and the cylinder and venting the cylinder to the atmosphere. Spring 29 disengages the clutch. The transmission being now free at both ends, the gear shift may be put in any desired speed without clashing. When the gear shift is moved to any of its four meshing positions the valve moves to the left, establishing communication between the tank and the cylinder. Then the piston moves back in the cylinder, tensioning the spring 29 and permitting the clutch to engage.

It will be observed that when shifting gears the clutch engages immediately after the gear shift is put in gear. It is desirable that means be provided whereby the clutch may be disengaged and held open as long as the driver desires, regardless of whether the gear shift be in neutral or in gear.

A lever having arms 64 and 65 is fulcrumed at 66 and carries at the end of arm 64 a control button 67 accessible to the left foot of the driver. The left-hand end of the valve plunger 38 is formed with a slot 65a. A push rod 68 is connected at one end to the lower end of arm 65 and has its opposite end arranged to work back and forth in the slotted end of the valve plunger. A spring 69 tends to rock the lever clockwise and thus normally holds button 67 raised. The valve, because of its lost motion connection with the button lever, is permitted to slide back and forth as the gear shift lever is moved, so long as the button is in its normal, raised position.

Suppose that the driver approaches a traffic signal which is set against him. To stop the car he may release the accelerator and put the gear shift in neutral, applying the brakes if necessary. The clutch is opened automatically. He may now depress the control button with his left foot and put the gear shift in "low", holding the button down until the traffic signal changes. The clutch will not be permitted to engage as long as his foot is on the button, even though the transmission be in gear. When the signal changes he releases the button and depresses the accelerator to speed up the engine while the clutch is engaging.

In order that the clutch may not engage too fast while the car is getting in motion, means may be provided whereby the clutch will engage more slowly when the button has been depressed to disengage it or hold it disengaged, than when the button has not been used. This means, as shown, consists of a pivoted dog 70 which hooks over a stud 71 on the button lever when the latter is depressed. A spring 72 tends to move the dog toward stud 71. Normally this dog is held out of the way of the stud by a short arm 73 which engages the end of a screw 74 on the dog. This arm is normally held in contact with the screw by a pull rod 75 which connects it to arm 28.

When the button is moved down by the foot of the driver and the valve plunger 38 moved to the right, piston 32 moves out and the clutch is opened. As arm 28 moves up, arm 73 moves with it and permits dog 70 to be swung on its pivot by spring 72. When the button is released it does not move back fully but is arrested by the dog when the valve is opened only slightly and the button is about half way back (up) to its normal position. The piston moves in slowly, moving arm 27 to the left and permitting the clutch to close. When the clutch is nearly engaged, pull rod 75 and arm 73 move the dog back, causing it to unhook from stud 71, and the button lever is permitted to move the rest of the way.

When the clutch is engaged it may be disengaged by pressure upon the clutch pedal, and it may be let in as slowly or as rapidly as the driver may desire. This is sometimes of advantage in starting the car. Suppose the car is stationary and the engine is running. The driver desires to use the clutch pedal in starting. He depresses the pedal, thus opening the clutch, then puts the gear shift in "low". The piston now moves back in the cylinder and would permit the clutch to engage but it is held open by the driver, who may let it engage as slowly as he wishes. It is not necessary that the automatic clutch control or the free-wheeling be locked out in order to use the clutch pedal.

Free-wheeling clutches, as installed in present-day cars, are provided with means for making positive connection between the shaft of the transmission and the propeller shaft when it is desired to cut out the free-wheeling effect. The usual arrangement for this purpose includes a button on the instrument board of the car, with a push-pull wire extending from this button to a lever on the side of the transmission casing. This lever, as explained hereinabove, is connected to one member of a positive clutch, this member being splined on the shaft of the transmission, as previously explained and shown in the drawings, the lever being designated 47, on Figs. 1 and 10. If it be desired that the automatic operation of the main clutch be cut out at the same time that free-wheeling is cut out, this may be accomplished in my system of clutch control by connecting a light rod to lever 47 and running this rod to a suitable latch device which, when lever 47 is in the proper position, prevents the clutch being disengaged by spring 29.

At the lower end of arm 27 is a stud 76. Pivoted at 77 is an arm 78 which is connected by a rod 79 to lever 47. Also pivoted at 77 is a latch member or dog 80, the end of which is formed to engage stud 76 when the dog is raised. A spring 81 tends to lift the dog and place it in the path of stud 76, but normally the dog is held depressed by the engagement with arm 78 of a finger 82 with which the dog is provided. When the button on the instrument board of the car is pulled out, wire 49 moves lever 47 to the left and arm 78 also moves to the left, permitting spring 81 to lift the dog into the path of stud 76. In the event that the gear shift is in neutral the stud will be in the dotted position shown on the drawings and the dog cannot engage the stud, but the first time the gear shift is put in gear thereafter, arm 27 will move to the left and the dog will engage the stud and prevent the clutch being again disengaged by spring 29 so long as the button on the dash is in the cut-out position. The fact that the valve maintains communication between the storage tank and the vacuum cylinder while the free-wheeling is cut out and the automatic means for operating the clutch is not in use is not of importance because the operation of the engine is not affected so long as air is not admitted to the system. When the valve moves to the right, port 39 closes before port 41 opens and the amount of vacuum lost is inconsequential so long as the piston is not permitted to move.

Figure 5:
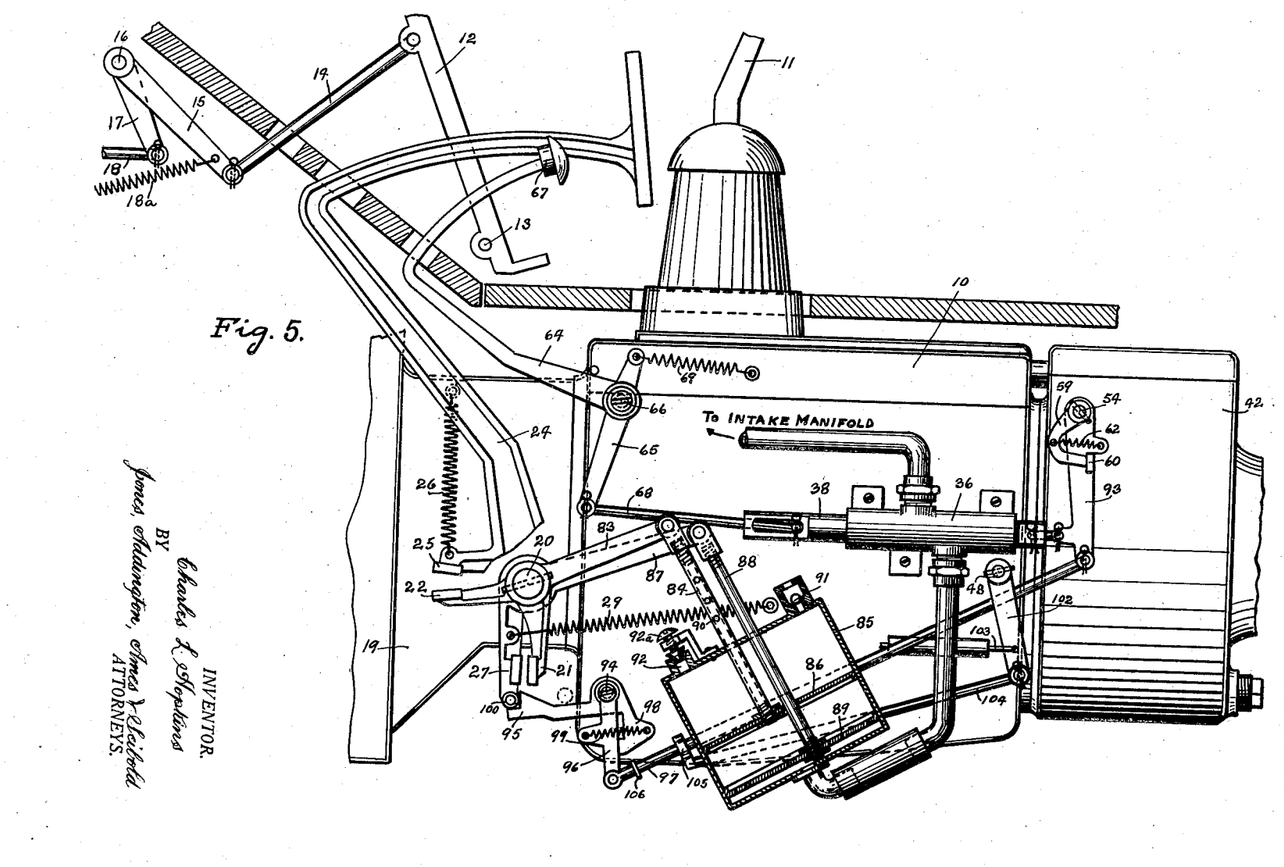
Fig. 5 is a view similar to Figure 1 but showing another embodiment of my invention.

In Fig. 5 I have shown a somewhat different form of automatic clutch-operating device. In this form, suction is not depended upon to hold the clutch-opening spring 29 ineffective while the clutch is to remain engaged, thus the storage tank is not needed. A latching device is provided which holds arm 27 back out of engagement with arm 21 after the suction-operated piston has been drawn back into its cylinder.

Referring then to Fig. 5, the clutch rock-shaft 20 has secured to it a member having three arms—arm 21 for engagement with arm 27, as in Fig. 1, arm 22 for engagement with arm 25 on the clutch pedal, as in Fig. 1, and an added arm 83. Connected to the outer end of arm 83 is a piston rod 84 which extends into the vacuum cylinder 85 and is secured to a piston 86 which is arranged to slide in the cylinder. Turning loosely on the rock-shaft 20, as in Fig. 1, is a member having two arms—arm 27 for engagement with arm 21 to disengage the clutch when spring 29 is permitted to function, and another arm 87 which is connected to a piston rod 88. This piston rod is secured to a piston 89 which slides in the cylinder.

In order that the pistons may move independently of each other, the space between them in the cylinder should be open to the atmosphere. For this reason piston rod 84 is made hollow and provided with perforations 90. A check valve 91 permits air to flow out of the space behind piston 86 when the clutch opens, but will not permit air to go past it to get into the cylinder. Valve 92 provides a small adjustable leak port through which air may pass into the cylinder to permit piston 86 to move inwardly as the clutch engages. Piston 86 thus acts as a dash pot to slow down the engagement of the clutch. The rate of engagement is adjusted by turning the screw 92a in or out.

In the drawings, both pistons are shown moved back in the cylinder to their rearmost positions. Arm 27, which is rigid with arm 87 and thus moves with piston 89, is out of engagement with arm 21 which is rigid with the clutch shaft and with arm 83 and moves with piston 86. The clutch is therefore permitted to remain engaged. This condition would exist so long as sufficient suction were applied to the piston to hold arm 27 against the tendency of spring 29 to move it to the right and disengage the clutch. However, under certain conditions the vacuum in the engine intake manifold might not be high enough to overcome the power of spring 29 and I therefore provide positive means whereby, after the piston has been drawn back in the cylinder, arm 27 is locked out of engagement with arm 21 and spring 29 is for the time rendered ineffective to disengage the clutch. This means may, as shown, consist of a latching device arranged to be thrown into or out of effective condition with the movement of the valve which controls the suction-operated piston.

It will be recalled that when the plunger 38 of control valve 36 is in the left-hand position, as in Figs. 1 and 2, communication is established between the source of vacuum and the operating cylinder, and that this is the position of the plunger when the gear shift is in any position except neutral, unless the left-foot button is depressed. The same is true in the case of the form shown in Fig. 5. Arm 93 corresponds to arm 61 of Fig. 1. This arm swings to the right when the gear shift is put in neutral or button 67 is depressed. In this form of the invention arm 93, or button 67, not only moves the valve plunger but in addition controls the operation of the locking means above-mentioned.

The locking means may comprise a pivoted member arranged to act as a spring latch. Pivoted at 94 is a swinging dog 95 and pivoted on the same center with the dog is an arm 96 connected by means of a light rod 97 to the lower end of arm 93, so as to swing with the latter. The dog is formed with an extension 98 for engagement with arm 96, a spring 99 being attached at its ends to these parts and drawing them together. The arm swings to the right as the gear shift goes from a gear-engaging position to neutral, pulling dog 95 down. The lower end of arm 27 carries a roller 100. When the dog 95 is swung upward it moves into the path of this roller and prevents arm 27 from moving to the right so long as the dog remains in this position.

As shown in Fig. 5, the gear shift is supposed to be in high gear. Valve plunger 38 is in the left-hand position. Piston 89 has moved back in the cylinder, permitting the clutch to engage. Dog 95 has locked arm 27 back. Now, if the suction effect from the engine manifold should become insufficient to resist the power of spring 29, the clutch would still be permitted to remain engaged because of the presence of the latching device. Now, suppose the driver of the car desired to shift gears. He would release the accelerator and at the same time put the gear shift in neutral position; arm 93 would be swung to the right, shifting the valve plunger and opening the latching device, and spring 29 would move arm 27 into engagement with arm 21, disengaging the clutch and carrying the pistons to the upper part of the cylinder. Check valve 91 would permit air rapidly to pass out of the cylinder as the pistons moved up, so that the clutch could be opened quickly.

When the gear shift is again put in gear-engaging position, the engine will still be idling and the suction effect is at its maximum, with the result that the piston 89 will be drawn back quickly, permitting the clutch to engage at the rate determined by the size of the opening at valve 92. As the arm 93 swings to the left to shift the valve plunger rod 97 moves arm 96 to the left and dog 95 moves into the locking position. The engine can now be speeded up and if the vacuum should fall to a point where it could not hold piston 89 against the tendency of spring 29 to move it, this would be of no consequence.

In the form shown in Fig. 1, the clutch may be disengaged at the will of the driver, even though the gear shift is in a gear-engaging position, by depressing the left foot button 67. By means of the button, the clutch may be held disengaged as long as desired after it has been disengaged by the gear shift. When the button is depressed to shift the valve plunger arm 93 swings to the right and, as explained hereinabove, this disengages the latching device, the rod 97 pulling dog 95 down out of the path of roller 100.

Assuming that the gear shift is in high gear and all of the parts are in the positions shown in Fig. 5, if the driver desires to stop the car he will release the accelerator and put the gear shift in neutral. This will cause the clutch to be opened by spring 29. The driver may then press button 67 down and put the gear shift in low gear, ready to start the car. As long as he holds the button down the clutch will stay disengaged, even after the gear shift has been put in low gear. When the driver is ready to start the car, he removes his foot from the button, and piston 89 is immediately drawn back by the suction from the engine, which is still idling and therefore provides ample vacuum for the purpose. The clutch does not, however, engage quickly, as the other piston is prevented from moving rapidly by the fact that air must pass through the small opening provided by valve 92 and enter the space behind piston 86. When the driver has released the button, he presses the accelerator to speed up the engine while the clutch is engaging.

When the valve plunger is moved to the right, whether by the button or the gear shift, it is to be noted that the first part of this movement cuts off the vacuum from the cylinder, then further movement of the plunger opens vent port 41 and permits piston 89 to move out and spring 29 to disengage the clutch. It is during the first part of the movement of the valve, and before the piston moves, that the latching device releases arm 27. It will be seen from the drawings that, as arm 93 swings to the right, the first part of this swing moves the dog 95 far enough to carry it out of the path of roller 100. Thus the dog is moved out of the way of the roller before spring 29 is permitted to act.

As explained in connection with Fig. 1, free wheeling units are commonly provided with means for locking out the free wheeling, and a typical unit has a lever or arm to which is secured one end of a push-pull wire leading to a button on the instrument panel of the car. When this lever is swung in the proper direction, a positive clutch engages and connects the shaft of the transmission with the propeller shaft. Such a lever is seen at 102 in Fig. 5, the push-pull wire being designated 103. In order that the automatic clutch control may be locked out when free wheeling is locked out, I connect to the lower end of lever 102 a rod 104 which has an eye 105 at its opposite end. Normally, rod 97 slides in this eye, but when lever 102 is thrown to the left, rod 104 moves along rod 97 and the eye engages a collar 106 on rod 97, preventing arms 93 and 96 from swinging to the right and disengaging the latching device.

It will be seen that in a car equipped with an automatic clutch operating device such as I have described in this specification, the clutch is not engaged and disengaged every time the accelerator is released and depressed, as would be the case were the control valve operated from the accelerator. Unnecessary wear on the clutch facings and other parts is thus avoided.

Further modifications will be apparent to those skilled in the art and it is desired, therefore, that the invention be limited only by the prior art and the scope of the appended claims.

Having thus described my invention, what I claim and desire to secure by Letters Patent is:

1. An automatic clutch operating device for motor vehicles having a self-closing clutch and a gear shift, comprising energy storage means adapted to open the clutch against its tendency to close, suction operated means adapted to hold the energy-storage means off the clutch and prevent it from opening the clutch, valve means for controlling said suction-operated means, and means interconnecting said valve means and said gear shift, whereby said suction-operated means is effective while the gear shift is in gear-engaging position and permits said energy-storage means to open the clutch when the gear shift is in neutral.

2. An automatic clutch operating device for a motor vehicle having a self-closing clutch and a gear shift, comprising means tending to open the clutch against its tendency to close, and means controlled by the gear shift and adapted to hold the first named means off the clutch and prevent the clutch being opened by the first-named means, the second-named means being arranged so as to be effective while the gear shift is in gear-engaging position and to permit the said first-named means to open the clutch when the gear shift is in neutral.

3. In a clutch operating device for a motor vehicle having a self-closing clutch, a gear shift including a reciprocatory member movable in opposite directions in a common plane to establish a selected gear ratio, and an engine with an intake manifold, the combination of a cylinder, a piston in said cylinder operatively associated with the clutch and arranged to be moved by suction derived from the engine manifold, a valve for controlling the movement of the piston, and means connecting said member and valve to operate the latter during movements of said member in said opposite directions in a common plane, whereby the clutch is held open while the gear shift is in neutral and is permitted to close when the same is put in a gear-engaging position.

4. In a clutch operating device for a motor vehicle having a self-closing clutch, a gear shift, and an engine with an intake manifold, the combination of an energy-storage means arranged for opening the clutch against its tendency to close, a cylinder, a piston in the cylinder adapted to be moved by suction derived from the engine manifold and to store energy in said energy-storage means and to prevent the same from opening the clutch, a valve for controlling the application of suction to said piston, and connections between said valve and the gear shift, whereby the energy storage means is held off the clutch while the gear shift is in a gear engaging position.

5. In a clutch operating device for a motor vehicle having an engine, a gear shift, and a self-closing clutch, the combination of an energy-storage means for opening the clutch against its tendency to close, a cylinder, a piston in the cylinder arranged by its movement to store energy in said energy-storage means, a storage tank arranged to store energy from the engine, a conduit leading from said tank to said cylinder, a valve in said conduit, and connections between said valve and the gear shift whereby the energy storage means is held off the clutch while the gear shift is in a gear engaging position.

6. In a clutch operating device for a motor vehicle having a clutch and a gear shift, the combination of a fluid-pressure operated piston operatively associated with the clutch, a valve for controlling the movement of the piston, said valve being controlled by the gear shift so as to cause the clutch to open when the gear shift is in neutral and to close when it is in a gear-engaging position, and locking means also controlled by the gear shift for preventing the opening of the clutch in the event of failure of the fluid pressure.

7. In a clutch operating device for a motor vehicle having an engine, a gear shift, and a clutch, the combination of an energy-storage means for opening the clutch, engine energized means for storing energy in said energy-storage means, locking means arranged to prevent the clutch from being opened by said energy-storage means, and connections between the gear shift and said locking means whereby said energy-storage means is released for opening the clutch when the gear shift is put in neutral position.

8. In a clutch operating device for a motor vehicle having a gear shift and a clutch, the combination of an energy-storage means for opening the clutch, a fluid pressure operated piston for storing energy in said energy-storage means, locking means arranged to protect the clutch against being opened by said energy-storage means, a valve for controlling said piston, and connections whereby when the gear shift is put in neutral position the locking means is made to release the energy-storage means and the valve is shifted to permit the piston to move.

9. In a clutch operating device for a motor vehicle having a clutch, a gear shift and an engine with an intake manifold, the combination of a cylinder, a piston in the cylinder operatively associated with the clutch and arranged to be moved by suction from the engine manifold, a valve for controlling the movement of the piston, locking means arranged to prevent movement of the piston when the gear shift is in a gear-engaging position, said valve and said locking means being so connected to the gear shift as to cause the clutch to open when the gear shift is put in neutral.

10. A clutch operating device for a motor vehicle having a gear shift and a self-closing clutch, comprising an energy-storage means for opening the clutch against its tendency to close, fluid-pressure operated means arranged to release the clutch from said energy-storage means when the gear shift is put in a gear-engaging position and thus permit the clutch to close and at the same time store energy in said energy-storage means, adjustable means for retarding the closing movement of the clutch after it is released for closing, and a valve for controlling the fluid-pressure operated means, said valve being operated from the gear shift so that the energy storage means is imposed on the clutch and the latter is opened when the gear shift is put in neutral position.

11. A clutch operating device for a motor vehicle having a self-closing clutch, a gear shift, and an engine, comprising energy-storage means for opening the clutch against its tendency to close, engine-energized means arranged to release the clutch from said energy-storage means when the gear shift is put in a gear-engaging position, and adjustable means for retarding the closing movement of the clutch after it has been released for closing, said engine-energized means being so controlled from the gear shift that when the gear shift is put in neutral position the energy-storage means is imposed on the clutch and opens the same.

12. A clutch operating device for a motor vehicle having a clutch, comprising an energy-storage means for holding the clutch open, fluid-pressure operated means for relieving the clutch from the effect of the energy-storage means, a valve for controlling the fluid-pressure operated means, means for locking out the energy-storage means to prevent opening of the clutch when the fluid pressure falls, means for retarding the closing of the clutch after it has been released, and connections including the valve and the locking-out means, so arranged that the unlocking of the locking-out means is accompanied by the release of the energy-storage means and consequently the opening of the clutch.

13. A clutch operating device for a motor vehicle having a gear shift and a clutch, comprising an energy-storage means for holding the clutch open, fluid-pressure operated means for releasing the clutch from the energy-storage means so that it may close, a valve for controlling the fluid-pressure operated means, means for locking out the energy-storage means, means for retarding the closing of the clutch after it has been released, and connections whereby the unlocking of the locking-out means and the release of the energy-storage means occur when the gear shift is put in neutral position.

14. A clutch operating device for a motor vehicle having a clutch and an engine, comprising an energy-storage means for holding the clutch open, engine-energized means for relieving the clutch from the effect of the energy-storage means so that it may close, means for locking out the energy-storage means so that the clutch may remain closed when the power of the engine-energized means falls, means for retarding the closing of the clutch after it has been released, and connections whereby the unlocking of the locking-out means is accompanied by the release of the energy-storage means and consequently the opening of the clutch.

15. A clutch operating device for a motor vehicle having a clutch, comprising an energy-storage means for holding the clutch open, fluid pressure operated means for relieving the clutch from the effect of the energy-storage means, a valve for controlling the fluid pressure operated means, means for holding the energy-storage means to prevent opening of the clutch when fluid pressure falls, and connections including the valve and the holding means, so arranged that the shifting of the valve to render the fluid pressure operated means ineffective is accompanied by the release of the holding means.

16. A clutch operating device for a motor vehicle having a clutch and an engine, comprising an energy-storage means for holding the clutch open, engine-energized means for relieving the clutch from the effect of the energy-storage means so that it may close, means for controlling the power of the engine-energized means, means for holding the energy-storage means so that the clutch may remain closed when the power of the engine-energized means falls, and connections including the power controlling means and the holding means so arranged that shutting off of power by the controlling means is accompanied by the release of the holding means.

17. In a clutch operating device for a motor vehicle having a self-closing clutch, a gear shift including a reciprocatory member movable in opposite directions in a common plane to establish a selected gear ratio, and a source of fluid pressure, the combination of a fluid pressure motor having a movable element operatively associated with the clutch, a connection between said source and motor, valve means for controlling said connection, and means connecting said member and valve to operate the latter during movements of said member in said opposite directions in a common plane whereby the clutch is held open while the gear shift is in neutral and is permitted to close when the same is put in a gear-engaging position.

18. In a clutch operating device for a motor vehicle having a self-closing clutch, a transmission of the type having a gear-shifting member normally occupying a neutral position but constrained for movement from said neutral position in opposite directions in a common plane to establish a desired gear relation, and a source of fluid pressure, the combination of a cylinder, a piston in said cylinder operatively associated with the clutch and arranged to be moved under the influence of fluid pressure from said source, and valve means for controlling the application of fluid pressure to said cylinder, said valve means being operated solely by movement of the gear-shifting member from said neutral position in said opposite directions in a common plane.

19. In a clutch operating device for a motor vehicle having a self-closing clutch, a transmission of the type having a slidable gear-shifting rod normally occupying a neutral position but constrained for longitudinal slidable movement in opposite directions in a common plane to establish a desired gear relation, and a source of fluid pressure, the combination of a cylinder, a piston in said cylinder operatively associated with the clutch and arranged to be moved under the influence of fluid pressure from said source, and valve means for controlling the application of fluid pressure to said cylinder, said valve means being operated solely by movement of the gear-shifting rod in said opposite directions in said common plane.

20. In a clutch and transmission operating device for a motor vehicle having a self-closing clutch, a shiftable gear transmission and a source of fluid pressure, the combination of a clutch motor having a movable element operatively connected with the clutch, means for shifting said transmission to effect a change in the speed ratio thereof including a part reciprocable in opposite directions from a central neutral position, valve means for controlling the application of fluid pressure to said motor, and means for operating said valve means including cam mechanism movable with said part and operative to actuate said valve means when said part is moved in either of said opposite directions.

21. In a clutch and transmission operating device for a motor vehicle having a self-closing clutch, a shiftable gear transmission and a source of fluid pressure, the combination of a clutch motor having a movable element operatively connected with the clutch, means for shifting said transmission to effect a change in the speed ratio thereof including a rod having limited reciprocable movement in opposite directions, valve means for controlling the application of fluid pressure to said motor, cam mechanism carried by and movable with said rod, and means including an oscillatable lever for operatively connecting said mechanism and valve means.

22. In a clutch and transmission operating device for a motor vehicle having a self-closing clutch, a shiftable gear transmission and a source of fluid pressure, the combination of a clutch motor having a movable element operatively connected with the clutch, means for shifting said transmission to effect a change in the speed ratio thereof including a rod having limited reciprocable movement in opposite directions, a reciprocable valve means for controlling the application of fluid pressure to said motor, valve-operating means carried by said rod, and means including a stationarily pivoted lever for operatively connecting said valve means and said valve-operating means.

23. In a clutch and transmission operating device for a motor vehicle having a self-closing clutch, a shiftable gear transmission and a source of fluid pressure, the combination of a clutch motor having a movable element operatively connected with the clutch, means for shifting said transmission to effect a change in the speed ratio thereof including a rod having limited reciprocable movement in opposite directions, valve means for controlling the application of fluid pressure to said motor, cam mechanism carried by and movable with said rod, an oscillatable lever for controlling the operation of said valve means, and a roller carried by said lever and resiliently urged into contact at all times with the surface of said cam mechanism.

24. In a clutch and transmission operating device for a motor vehicle having a self-closing clutch, a shiftable gear transmission and a source of fluid pressure, the combination of a clutch motor having a movable element operatively connected with the clutch, means for shifting said transmission to effect a change in the speed ratio thereof including a rod having limited reciprocable movement in opposite directions from a central neutral position, a reciprocable valve device for controlling the application of fluid pressure to said motor, and means for operating said valve device at either extreme of movement of said rod comprising a cam mechanism carried by said rod and having at least three operating portions, a roller in constant engagement with said cam mechanism, and means including a pivotally-mounted lever for connecting said roller and valve device.

25. In a clutch and transmission operating device for a motor vehicle having a self-closing clutch, a shiftable gear transmission and a source of fluid pressure, the combination of a clutch motor having a movable element operatively connected with the clutch, means for shifting said transmission to effect a change in the speed ratio thereof including a rod having limited reciprocable movement in opposite directions from a central neutral position, a valve device for controlling the application of fluid pressure to said motor, and means for operating said valve device at either extreme of movement of said rod comprising a cam mechanism carried by said rod, a roller in constant engagement with said cam mechanism, and means for connecting said roller and valve device.

26. In a clutch and transmission operating device for a motor vehicle having a self-closing clutch, a shiftable gear transmission and a source of fluid pressure, the combination of a clutch motor having a movable element operatively connected with the clutch, means for shifting said transmission to effect a change in the speed ratio thereof including an oscillatable selector and shifter member and a rod reciprocable in opposite directions from a central neutral position, a cam device carried by said rod, a reciprocable valve means for controlling the application of fluid pressure to said motor, and means including a roller for operatively connecting said valve means and cam device whereby the valve means is operated by the device during movement of said selector member and rod.

27. In a clutch-operating device for a motor vehicle having a self-closing clutch, a transmission, and a source of fluid pressure, the combination of a cylinder, a piston in said cylinder operatively associated with the clutch and arranged to be moved under the influence of fluid pressure derived from said source, a member associated with said transmission and shiftable in opposite directions from a central neutral position for effecting changes in the transmission ratio, reciprocable valve mechanism for controlling the application of fluid pressure to said motor, and means to positively move the valve mechanism solely by said member during ratio-changing movement of the latter in either direction from the central neutral position, said last named means including mechanical connections between said valve mechanism and member.

28. In an automobile, the combination with a motor and driven road wheels, of a variable speed gear, a clutch disposed between the motor and the variable speed gear, power means for operating said clutch, gear-changing means, means actuated by the operation of said last named means for controlling said power means to bring about disengagement of said clutch during changes of gear, and a free-wheel device operative between the variable speed gear and the driven road wheels and serving in conjunction with the power operated clutch to isolate the variable speed gear to facilitate gear-changing.

CHARLES L. HOPKINS.